United States Patent
Ito

(10) Patent No.: US 8,325,120 B2
(45) Date of Patent: Dec. 4, 2012

(54) ELECTROOPTICAL APPARATUS AND ELECTRONIC DEVICE

(75) Inventor: Akihiko Ito, Tatsuno-machi (JP)

(73) Assignee: Seiko Epson Corporation, Tokyo (JP)

( * ) Notice: Subject to any disclaimer, the term of this patent is extended or adjusted under 35 U.S.C. 154(b) by 375 days.

(21) Appl. No.: 12/824,402

(22) Filed: Jun. 28, 2010

(65) Prior Publication Data
US 2010/0328553 A1    Dec. 30, 2010

(30) Foreign Application Priority Data
Jun. 30, 2009 (JP) ................................. 2009-154809

(51) Int. Cl.
G09G 3/36 (2006.01)
(52) U.S. Cl. ................................. 345/87; 349/9; 353/33
(58) Field of Classification Search .................... 345/87; 349/7; 353/33
See application file for complete search history.

(56) References Cited

U.S. PATENT DOCUMENTS
5,982,538 A    11/1999    Shikama et al.
2006/0066811 A1*    3/2006    Sato et al. ........................ 353/20
2009/0086112 A1*    4/2009    Kaida et al. ....................... 349/9

FOREIGN PATENT DOCUMENTS
JP    02-144516    6/1990
JP    07-270780    10/1995
JP    2001-209007    8/2001
JP    2004-061599    2/2004

* cited by examiner

*Primary Examiner* — Kevin M Nguyen
(74) *Attorney, Agent, or Firm* — Maschoff Gilmore & Israelsen

(57) ABSTRACT

An electrooptical apparatus includes a plurality of first electrooptical panels which enable a color image to be displayed by combining output lights from the plurality of first electrooptical panels, a polarization axis correction unit through which the output lights from each of the plurality of first electrooptical panels are transmitted and which makes polarization axes of the transmitted output lights aligned, and a polarization axis switching section which switches a polarization axis of the output light from the polarization axis correction unit to a direction intersecting with the direction of the polarization axis at a predetermined timing.

16 Claims, 9 Drawing Sheets

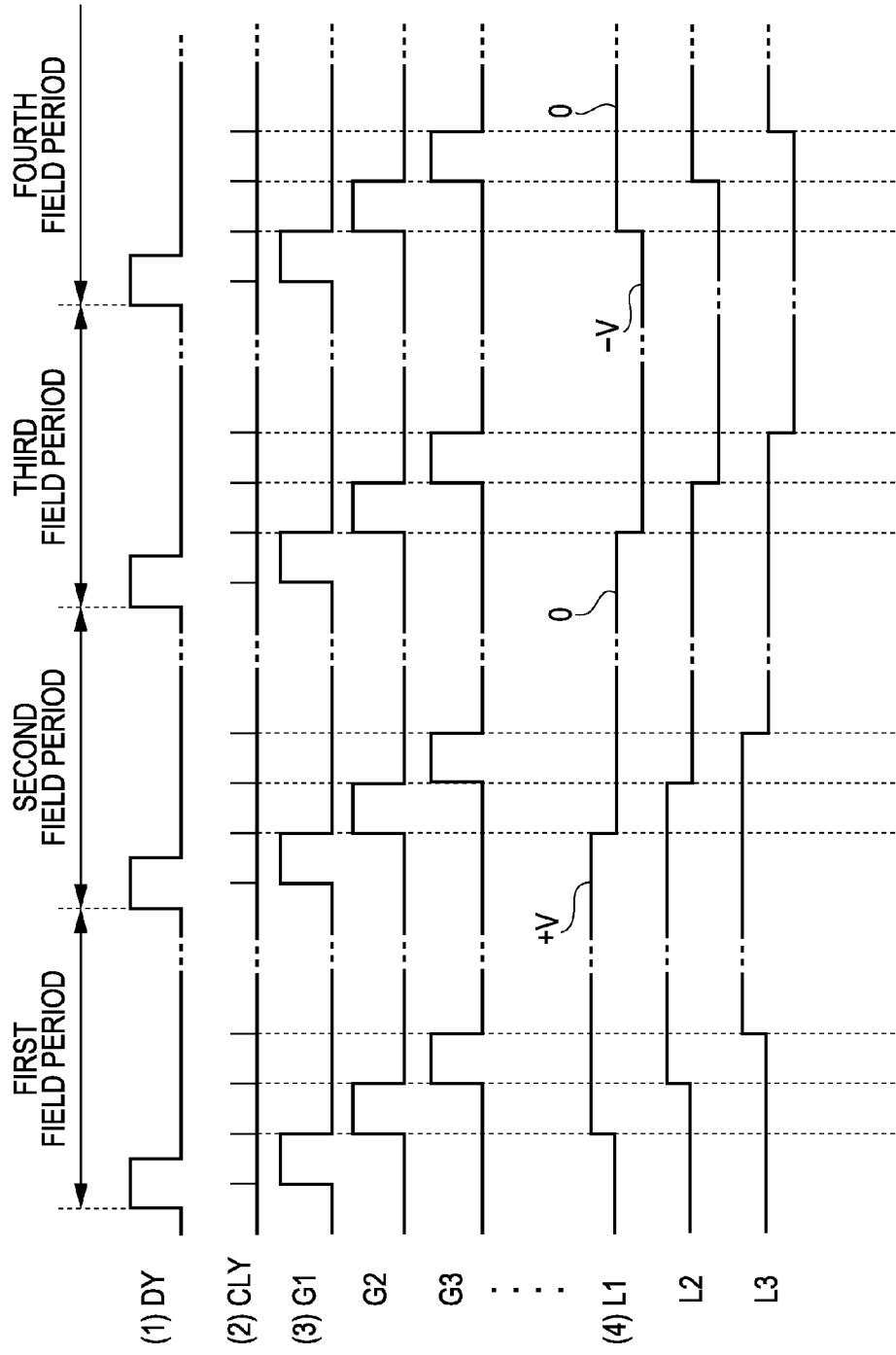

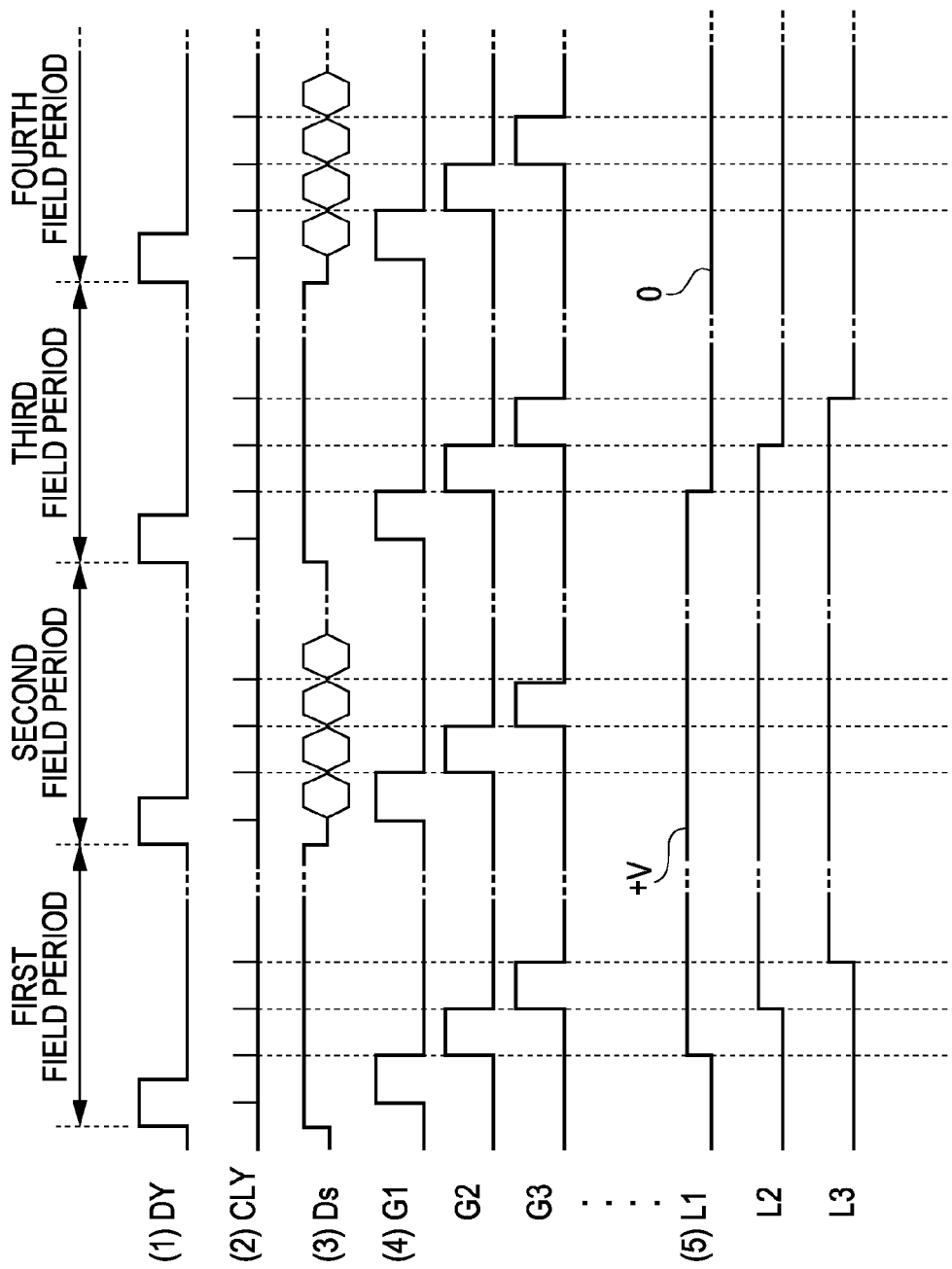

ELECTROOPTICAL APPARATUS AND ELECTRONIC DEVICE

BACKGROUND

1. Technical Field

The present invention relates to a technical field of an electrooptical apparatus and an electronic device which enable an observer to recognize a projected image three-dimensionally.

2. Related Art

As an example of an electrooptical apparatus which projects an image onto a screen, there is an electrooptical apparatus which enables an observer to recognize a projected image three-dimensionally by alternately displaying different images corresponding to observer's right and left eyes. One of principle systems applied to the electrooptical apparatus of this type is that an observer with polarization glasses observes projected images while two kinds of images are alternately projected. The two kinds of images have polarization axes which are orthogonal to each other. Further, the polarization glasses are configured by arranging polarization plates having polarization directions corresponding to each of the images on the left and right sides. With this system, images each of which is taken into each of the left and right eyes by the observer are synthesized in the brain so that the observer can recognize the projected images three-dimensionally.

For example, JP-A-7-270780 discloses a technique by which a stereoscopic image is color-displayed by providing a polarization switching device on each of three liquid crystal panels. In the technique, the three liquid crystal panels correspond to red (R), green (G) and blue (B), respectively.

Display lights of which polarization axes have been previously made aligned is required to be transmitted through a device for switching the polarization axes in order to project two kinds of images having polarization axes which are orthogonal to each other. In JP-A-7-270780, the display lights are formed by combining optical components from the three liquid crystal panels. Therefore, a plurality of devices for switching polarization axes are required to be arranged according to the number of the liquid crystal panels. This causes a problem that the number of parts constituting an electrooptical apparatus is increased resulting in increase in manufacturing cost and the product size. In addition, there is also a problem that it is difficult to preferably perform synchronization control where operation timings of the liquid crystal panels and the devices for switching polarization axes are suitably controlled because there are a plurality of devices for switching polarization axes.

SUMMARY

An advantage of some aspects of the invention is to provide an electrooptical apparatus and an electronic device of which sizes are reduced and which can display a color stereoscopic image with high definition.

An electrooptical apparatus according to an aspect of the invention includes a plurality of first electrooptical panels which enable a color image to be displayed by combining output lights from the plurality of first electrooptical panels, a polarization axis correction unit through which the output lights from each of the plurality of first electrooptical panels are transmitted and which makes polarization axes of the transmitted output lights aligned, and a polarization axis switching section which switches a polarization axis of the output light from the polarization axis correction unit to a direction intersecting with the direction of the polarization axis at a predetermined timing.

The electrooptical apparatus according to the aspect of the invention enables two kinds of images having polarization axes intersecting with each other to be alternately projected. If the projected two kinds of images are set to be images which can be visually recognized by the left and right eyes of an observer, the observer with polarization glasses can recognize the projected images three-dimensionally. As the projected two kinds of images which can be visually recognized by the left and right eyes of the observer, images shoot by cameras positioned so as to correspond to the left and right eyes are exemplified. The polarization glasses are configured by arranging polarization plates corresponding to each of the two images on the left and right sides. Stereoscopic images displayed in this case may be still images or moving images. The two polarization axes are typically or ideally orthogonal to each other. However, the two polarization axes may be deviated from the orthogonality to the degree where the stereoscopic display is not adversely affected.

The plurality of first electrooptical panels can display a color image by combining the output lights therefrom. Typically, the plurality of first electrooptical panels may be three electrooptical panels corresponding to RGB, or four electrooptical panels corresponding to C (cyan), M (magenta), Y (yellow) and K (key). Further, the plurality of first electrooptical panels may be configured so as to realize color display with each single panel.

The first electrooptical panels are liquid crystal panels, for example. For example, each of the first electrooptical panels is configured by sandwiching an electrooptical substance such as a liquid crystal between a device substrate and a counter substrate. Transistors for pixel switching, data lines, scanning lines, pixel electrodes and the like are formed on the device substrate. Further, a counter electrode is formed on the counter substrate. Various modes can be considered as a driving method of the electrooptical panels. For example, a driving method with a so-called active matrix system can be employed. In the active matrix system, image signals are supplied from data lines through the transistors to the pixel electrodes at a predetermined timing by turning ON/OFF the transistors. The transistors are electrically connected between the data lines and the pixel electrodes. Note that the electrooptical panel may be a transmission type or a reflection type and outputs light incident from the light source as output light corresponding to an image signal.

The polarization axis correction unit transmits the output lights from each of the plurality of first electrooptical panels therethrough while making polarization axes of the transmitted output lights aligned. At this time, an expression "making the polarization axes aligned" has wide meaning including a state where the polarization axes of the output lights are made aligned to be in the same direction perfectly. In addition to the state, the expression also includes a state where the polarization axes of the output lights are made aligned to the degree where an adverse effect is not caused at all or less when two kinds of images are formed to make an observer recognize the images three-dimensionally in a normal operation of the electrooptical apparatus. In other words, a state where the directions of the polarization axes are made nearly aligned is also included. For example, when polarization directions of the output lights from the three first electrooptical panels are different from one another, the following states are available. That is to say, polarization directions of the two first electrooptical panels may be adjusted to be aligned with the polarization direction of the remaining one first electrooptical panel or polarization directions of the three first electrooptical panels may be adjusted to be aligned with a direction different from any polarization directions thereof. Alternatively, when polarization directions of the output lights from the two first electrooptical panels among the three first liquid crystal panels are aligned in advance, the polarization direction of the remaining one first liquid crystal panel may be adjusted to be aligned with the polarization directions of the two first electrooptical panels. Or, the polarization directions of the two first electrooptical panels of which polarization directions are aligned in advance may be adjusted to be aligned with the polarization direction of the remaining one first electrooptical panel.

When optical components from each of the liquid crystal panels are incident on the polarization axis correction unit, a plurality of output lights from the plurality of first electrooptical panels are preferably combined into a single beam in advance. At this time, the plurality of output lights may be combined into a single beam by arranging a prism or the like on the light path of the output lights from the plurality of first electrooptical panels at a previous stage of the polarization axis correction unit. With this, the polarization axes of the output lights from the plurality of the first electrooptical panels can be collectively made aligned by one polarization axis correction unit. Therefore, the polarization axis correction unit is not required to be provided on each of the first electrooptical panels. This makes it possible to reduce the number of parts for the polarization axis correction unit so as to realize both of the reduction in the manufacturing cost and the reduction in the product size.

As described above, when the polarization direction of the output light corresponding to a specified color is changed by the polarization axis correction unit, a device having a wavelength dependency or a wavelength selectivity, which changes only a polarization axis of a light having a specified wavelength, is preferably used as the polarization axis correction unit. As the device, although described in detail below, a wavelength-selective polarization rotator ColorSelect (registered trademark) manufactured by Color Link, Inc. can be used.

The polarization axis switching section switches a polarization axis of the output light from the polarization axis correction unit to the direction intersecting with the direction of the polarization axis at a predetermined timing. The polarization axes of the output lights from the plurality of first electrooptical panels, which have been made aligned in advance by the above polarization axis correction unit, are switched at a predetermined timing by the polarization axis switching section. Therefore, two kinds of images having polarization axes intersecting with each other can be alternately projected onto a screen, for example. The two kinds of images correspond to the left eye and the right eye of an observer.

Image signals corresponding to the above two kinds of images are supplied from an image signal supply unit such as an image signal supply circuit to each of the first electrooptical panels at a specified constant or inconstant timing. The expression "switch at a predetermined timing" in the invention widely means that the polarization axis is switched so as to synchronize with the supply timings of such image signals. That is, the switching timing by the polarization axis switching section is preferably controlled such that the two kinds of images corresponding to the left and right eyes of the observer have the polarization axes orthogonal to each other.

The polarization axis switching device for switching the polarization axes is provided on each of the liquid crystal panels in JP-A-7-270780. Therefore, since there are many parameters to be synchronously controlled, it is difficult to control the parameters. With respect thereto, in the electrooptical apparatus according to the aspect of the invention, the polarization axis switching section is not required to be provided on each of the first electrooptical panels. Therefore, troublesome operations in terms of synchronization control can be reduced or eliminated. That is to say, images can be displayed with high definition by a simple control in which the polarization axis of the incident light onto the polarization axis switching section is switched at a predetermined timing.

The polarization axis switching section is formed as an electrooptical panel such as a liquid crystal panel with a TN (Twisted Nematic) liquid crystal sandwiched between substrates. In this case, as in the first electrooptical panels, the polarization axis switching section is preferably configured by sandwiching an electrooptical substance such as a liquid crystal between a device substrate and a counter substrate. Transistors for pixel switching, data lines, scanning lines, pixel electrodes and the like are formed on the device substrate. Further, a counter electrode is formed on the counter substrate.

As described above, with the electrooptical apparatus according to the aspect of the invention, an electrooptical apparatus of which size is reduced and which can display a color image with high definition can be realized.

In the electrooptical apparatus according to an aspect of the invention, the plurality of first electrooptical panels include an image signal supply unit that supplies image signals corresponding to display images, and the image signal supply unit supplies an image signal corresponding to black display for a predetermined period immediately after the predetermined timing.

The polarization axis switching section switches polarization axes so as to intersect with each other. As in the above example, when the polarization axis switching section is formed as the electrooptical panel with an electrooptical substance such as a liquid crystal sandwiched between substrates, the switching of the polarization axes is performed by sequentially scanning the scanning lines for a limited period of time. The scanning lines are wired on a transmission region through which the display lights are transmitted, for example. It is considered that the switching of the polarization axes requires a limited period of time as described. If the display lights are transmitted during the switching operation by the polarization axis switching section (that is, during the switching of the polarization axes of the transmitted lights), there is a possibility that the polarization axes of the output lights from the polarization axis switching section are not defined to one. This results in that the left-eye image and the right-eye image are mixed. For example, the left-eye image is mixed in an image to be a right-eye image normally. This causes deterioration in the image quality of the projected image. What is worse, it becomes difficult for an observer to recognize the image three-dimensionally.

With the electrooptical apparatus according to the aspect of the invention, such a problem can be solved by supplying an image signal corresponding to black display from the image signal supply unit in a predetermined period in which the switching operation by the polarization axis switching section is performed. In the electrooptical apparatus according to the aspect of the invention, the black display is set to the projected image in a predetermined period in which there is a possibility that the polarization axes of the output lights from the polarization axis switching section are not defined to one. Therefore, since the image displayed in the period is black display even when images having polarization axes intersecting with each other are mixed in one another, a stereoscopic image is not affected. In other words, two kinds of images corresponding to the left and right eyes of the observer can be clearly separated by performing black display in a predetermined period which corresponds to a timing of switching the left and right images.

The expression "predetermined period" means a period in which the switching operation by the polarization axis switching section is performed. That is, the expression means a period in which there is a possibility that the polarization axes of the output lights from the polarization axis switching section are not defined to one. In practice, the predetermined period is preferably set by adding some margin to a period required for the switching operation by the polarization axis switching section. However, as a predetermined period in which the black display is performed is long, a period in which the projected image is normally displayed is short. This may cause deterioration in the image quality (for example, the image becomes dark). Accordingly, the length of the "predetermined period" in which the black display is performed is preferably set in advance theoretically or experimentally or by a simulation such that the image quality of the projected image is made to be the best in consideration of these factors.

It is preferable that the electrooptical apparatus according to another aspect of the invention include a prism that refracts each of the output lights from the plurality of first electrooptical panels such that incident light onto the polarization axis correction unit becomes a single beam.

In the aspect of the invention, optical components are combined into a single beam by the prism before the optical components are incident onto the polarization axis correction unit by arranging the prism on the light path of the optical components from the plurality of first electrooptical panels at a previous stage of the polarization axis correction unit. That is, the prism typically functions as a synthesis prism or a dichroic prism having a dichroic mirror surface. Then, it is sufficient that the polarization axis correction unit makes the polarization axis of the single beam aligned. Therefore, a polarization axis correction unit is not required to be provided on each of the plurality of first electrooptical panels. As a result, the number of parts can be reduced so as to realize both of the reduction in the manufacturing cost and the reduction in the product size. It is to be noted that a synthesis optical system configured by combing a plurality of dichroic mirrors can be employed in place of such a prism.

The electrooptical apparatus according to another aspect of the invention, it is preferable that the polarization axis switching section be a second electrooptical panel that includes TN liquid crystal molecules.

In the aspect, the polarization axis switching section is an electrooptical panel such as a liquid crystal panel with the TN liquid crystal sandwiched between the substrates. In this case, as in the first electrooptical panels, the polarization axis switching section is configured by sandwiching an electrooptical substance such as a liquid crystal between a device substrate and a counter substrate. Transistors for pixel switching, data lines, scanning lines, pixel electrodes and the like are formed on the device substrate. Further, a counter electrode is formed on the counter substrate.

In the above aspect where the polarization axis switching section is the second electrooptical panel, it is preferable that a timing of updating display images on the plurality of first electrooptical panels be synchronized with the predetermined timing.

In the aspect, the left-eye image and the right-eye image can be effectively suppressed to be mixed by synchronizing a scanning timing of the second electrooptical panel as the polarization axis switching section with the refreshing timing of the display images on the first electrooptical panels. As a result, the image quality of the projected stereoscopic image can be effectively improved. It is preferable that the field frequencies of the first and second electrooptical panels be made to be the same, as a specific example in terms of synchronization of the scanning timings. Such synchronization can be easily realized by using a common clock signal and a common trigger signal in the first and second electrooptical panels.

It is preferable that the electrooptical apparatus according to another aspect of the invention include a projection lens that projects the color image in an enlargement or reduction manner.

In the aspect, display lights are transmitted through the projection lens so as to project the display lights onto a screen surface on which image is displayed in an enlargement or reduction manner. In this case, the projection lens may be arranged between the first electrooptical panels and the polarization axis correction unit, between the polarization axis correction unit and the polarization axis switching section, or between the polarization axis switching section and the screen surface.

In the aspect where the projection lens is provided, the output lights from the projection lens may be transmitted through the polarization axis correction unit and the polarization axis switching section.

In the aspect, the output lights from the projection lens are transmitted through the polarization axis correction unit and the polarization axis switching section by arranging the projection lens between the first electrooptical panels and the polarization axis correction unit.

In the aspect where the projection lens is provided, the output lights from the polarization axis switching section may be transmitted through the projection lens.

In the aspect, the output lights from the polarization axis switching section are transmitted through the projection lens by arranging the projection lens between the polarization axis switching section and a screen surface which is a surface on which an image is projected, for example. The projection lens may be integrally combined with the first electrooptical panel, the polarization axis correction unit and the polarization axis switching section or may be configured so as to be attachable thereto afterward.

An electronic device according to an aspect of the invention includes the above electrooptical apparatus according to the aspects of the invention (including various aspects thereof) in order to solve the above problem.

The electronic device according to the aspect of the invention includes the above electrooptical apparatus according to the aspects of the invention. Therefore, various types of electronic devices such as a projection type liquid crystal projector, which is capable of displaying high quality images, can be realized.

An effect and other advantages of some aspects of the invention will be obvious from description of exemplary embodiments which will be described below.

BRIEF DESCRIPTION OF THE DRAWINGS

The invention will be described with reference to the accompanying drawings, wherein like numbers reference like elements.

FIG. 9 illustrates timing charts of each control signal input/output to/from the liquid crystal panel and the polarization axis switching panel when the liquid crystal projector according to the embodiment is operated.

FIG. 10 illustrates timing charts of each control signal input/output to/from the liquid crystal panel and the polarization axis switching panel when the liquid crystal projector according to a modification is operated.

DESCRIPTION OF EXEMPLARY EMBODIMENTS

Figure 1:
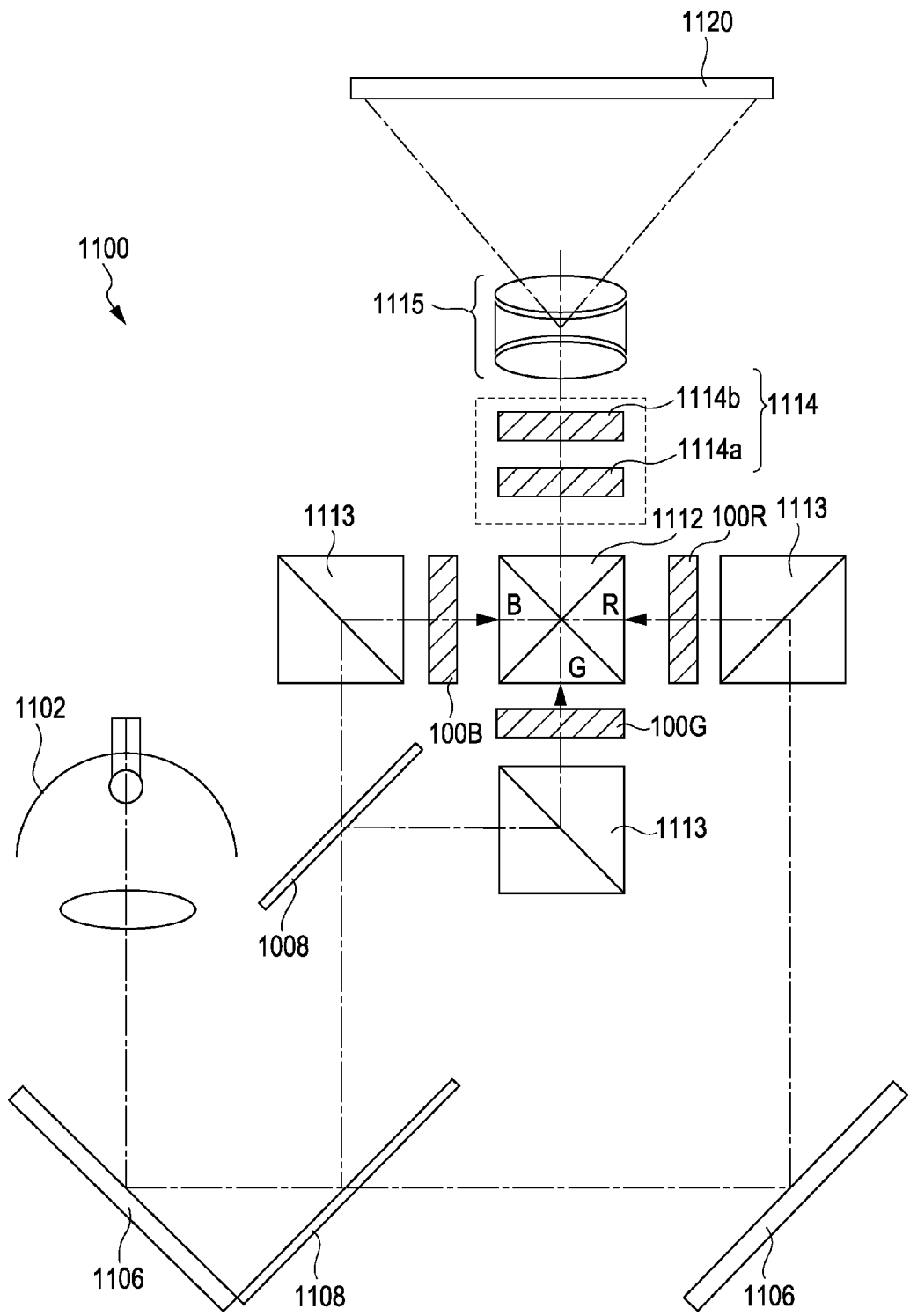
FIG. 1 is a cross-sectional view schematically illustrating an entire configuration of a liquid crystal projector according to the embodiment.

Hereinafter, an embodiment of the invention will be described with reference to drawings. In the embodiment below, a projection type liquid crystal projector is described as an example of an electronic device to which an electrooptical apparatus according to the invention is applied.
Configuration of Liquid Crystal Projector An entire configuration of the liquid crystal projector according to the embodiment is described with reference to FIG. 1, at first. FIG. 1 is a cross-sectional view schematically illustrating the entire configuration of the liquid crystal projector according to the embodiment.

In FIG. 1, a liquid crystal projector 1100 according to the embodiment is configured as a double-plate color projector using three liquid crystal light bulbs 100R, 100G, 100B for RGB. Each of the liquid crystal light bulbs 100R, 100G, 100B is accommodated in a predetermined holding case for fixing a liquid crystal panel 1 to an outer wall of the liquid crystal projector 1100. It is to be noted that the liquid crystal panel 1 is an example of a "first electrooptical panel" of the invention.

As shown in FIG. 1, in the liquid crystal projector 1100, when a source light is emitted from a lamp unit 1102, the source light is divided into optical components R, G, B by two mirrors 1106, two dichroic mirrors 1108 and three polarization beam splitters (PBS) 1113. The lamp unit 1102 is formed of a white light source such as a metal halide lamp. Further, the optical components R, G, B correspond to three primary colors of RGB, respectively. Each of the optical components is introduced to each of the corresponding liquid crystal light bulbs 100R, 100G, 100B. In this case, a lens may be appropriately provided on the way of a light path in order to prevent optical loss in the light path. Then, the optical components corresponding to the three primary colors are combined into a single beam by a cross prism 1112. The optical components have been modulated by the liquid crystal light bulbs 100R, 100G, 100B, respectively. Thereafter, the optical components, being combined into a single beam, is incident onto a polarization axis switching unit 1114.

The polarization axis switching unit 1114 includes a color select panel 1114a and a polarization axis switching panel 1114b. The color select panel 1114a is an example of a "polarization axis correction unit" in the invention. Further, the polarization axis switching panel 1114b is an example of a "polarization axis switching section" in the invention. The output lights transmitted through the polarization axis switching unit 1114 are transmitted through a projection lens 1115, and then, enlarged and projected onto a screen 1120 as a color image.

In the liquid crystal projector 1100 according to the embodiment, the projection lens 1115 enlarges and projects the output lights transmitted through the polarization axis switching unit 1114. However, the projection lens 1115 may reduce and project the output lights onto the screen 1120 depending on a requested specification for the liquid crystal projector 1100. Alternatively, a plurality of projection lenses 1115 may be provided so as to be switchable, thereby realizing both of the enlargement projection and the reduction projection.

In the embodiment, the polarization axis switching unit 1114 is arranged at such a position that the output lights therefrom are incident onto the projection lens 1115 (that is, at the inner side with respect to the projection lens 1115 in the liquid crystal projector 1100). However, the polarization axis switching unit 1114 may be arranged at such a position that the output lights from the projection lens 1115 are incident onto the polarization axis switching unit 1114. (That is, the positions of the polarization axis switching unit 1114 and the projection lens 1115 in FIG. 1 may be inverted.) In this case, the polarization axis switching unit 1114 may be configured so as to be integrated with a main body of the liquid crystal projector 1100. Alternatively, the polarization axis switching unit 1114 may be configured as a part which is detachably attachable to the main body of the liquid crystal projector 1100. If the polarization axis switching unit 1114 is configured as a part which is attachable to the projector main body afterward, the electrooptical apparatus according to the invention can be extremely easily realized practically by attaching the polarization axis switching unit 1114 to various types of commonly distributed projectors. Therefore, such configuration is extremely practical.

In the embodiment, the optical components corresponding to each of the primary colors of RGB are incident onto the liquid crystal light bulbs 100R, 100G, 100B by the dichroic mirrors 1108 and the polarization beam splitters 1113. Therefore, a color filter is not required to be provided on each of the three liquid crystal light bulbs 100R, 100G, 100B for RGB. Note that the color filter may be provided on each of the three liquid crystal light bulbs 100R, 100G, 100B for RGB in the case where the polarization beam splitters 1113 are not provided.

The liquid crystal projector 1100 is configured such that projected images can be recognized three-dimensionally by an observer with polarization glasses by alternately projecting a left-eye image and a right-eye image at predetermined timings onto the screen 1120. The switching timings for switching the left-eye image and the right-eye image and a detailed mode of the polarization glasses which the observer wears are described below.

Figure 2A:
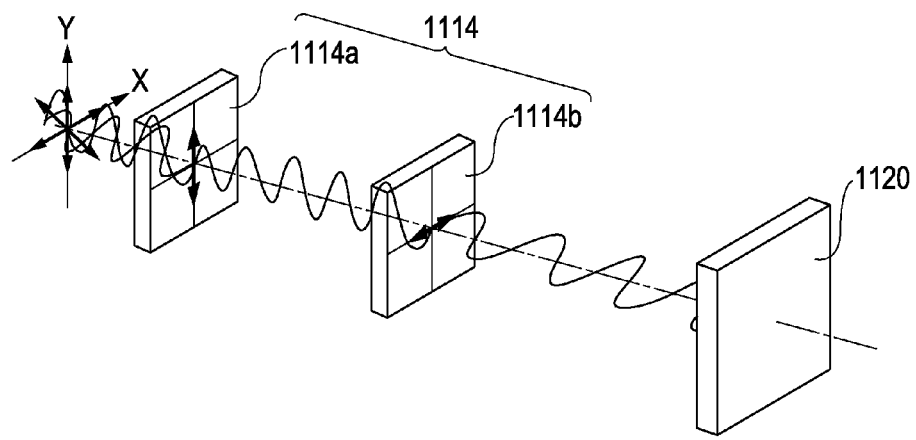
FIGS. 2A and 2B are conceptual views schematically illustrating polarization axes of an output light from a cross prism at each stage in transmission of the output light through a polarization switching unit of the liquid crystal projector according to the embodiment.
Figure 2B:
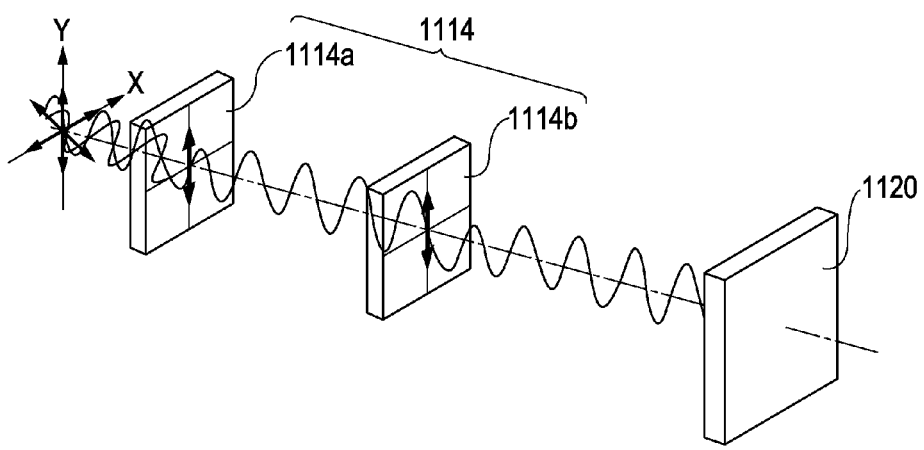

The polarization axes of the output lights from the cross prism 1112 at each stage in the transmission of the output lights through the polarization axis switching unit 1114 are described in detail with reference to FIGS. 2A and 2B. FIGS. 2A and 2B are conceptual views schematically illustrating polarization axes of the output light from the cross prism 1112 at each stage in the transmission of the output light through the polarization axis switching unit 1114.

The optical components from the plurality of the liquid crystal light bulbs 100R, 100G, and 100B are combined in the output lights from the cross prism 1112. In the embodiment, each of the optical components from the liquid crystal light bulbs 100R, 100B have a polarization axis in the same direction (X direction) among the liquid crystal light bulbs 100R, 100G, 100B. However, the optical component from the liquid crystal light bulb 100G has a polarization axis in the direction (Y direction) different from that of the optical components from the liquid crystal light bulbs 100R, 100B. Here, the X direction and the Y direction are different from each other by 90°. Therefore, the output lights from the cross prism 1112 in which the optical components for RGB are combined has the polarization axes in the X direction and the Y direction.

The output lights from the cross prism 1112, which have polarization axes in a plurality of directions as described above, are transmitted through the color select panel 1114a. This makes it possible to make the directions of the polarization axes aligned. The color select panel 1114a is assembled as a part of the polarization axis switching unit 1114. The alignment of the polarization axes as described above can be realized by using a device as the color select panel 1114a. The device has a characteristic of changing the direction of a polarization axis by a predetermined angle for an optical component corresponding to a specified color. As a device suitable for the color select panel 1114a, for example, a wavelength-selective polarization rotator ColorSelect (registered trademark) manufactured by Color Link, Inc. can be exemplified. The product has a characteristic of changing a polarization axis of an optical component having a specified wavelength by a predetermined angel which is previously set. Therefore, the product suitably functions as the color select panel 1114a.

In the embodiment, the optical component from the liquid crystal light bulb 100G has a polarization axis in the Y direction while the optical components from the liquid crystal light bulbs 100R, 100B have polarization axes in the X direction. As described above, the Y direction is deviated from the X direction by 90°. Therefore, a device having a characteristic of rotating the polarization axis by 90° for the light having a wavelength corresponding to the optical component from the liquid crystal light bulb 100G is used as the color select panel 1114a. As a result, the output lights from the cross prism 1112 having a plurality of polarization axes are transmitted through the color select panel 1114a so as to make the polarization axes aligned. In the above JP-A-7-270780, a polarization axis switching device for making the polarization axes aligned is required to be arranged on each of the plurality of liquid crystal panels 100 corresponding to RGB. However, in the embodiment, only one color select panel 1114a is required to be arranged so as to make the polarization axes aligned. As a result, the number of parts constituting the liquid crystal projector 1100 can be suppressed to be small. This can contribute to the reduction in the manufacturing cost.

The output lights from the color select panel 1114a are incident onto the polarization axis switching panel 1114b constituting a part of the polarization axis switching unit 1114 together with the color select panel 1114a. The polarization axis switching panel 1114b switches the polarization axes of the output lights from the color select panel 1114a between the directions orthogonal to each other (that is, X direction and Y direction) alternately at predetermined timings. FIG. 2A is a conceptual view schematically illustrating polarization axes of the display light corresponding to a left-eye image. FIG. 2B is a conceptual view schematically illustrating polarization axes of the display light corresponding to a right-eye image. When the output lights from the color select panel 1114a, which have the polarization axis in the Y direction, are transmitted through the polarization axis switching panel 1114b at certain timing, the polarization axis is switched to the X direction (see, FIG. 2A). On the other hand, when the output lights are transmitted through the polarization axis switching panel 1114b at another timing, the polarization axis is kept in the Y direction (see, FIG. 2B). Display lights which have polarization axes in the directions orthogonal to each other and correspond to the left-eye image and the right-eye image, respectively, can be formed by controlling the polarization axis switching panel 1114b in such a manner.

Figure 3:
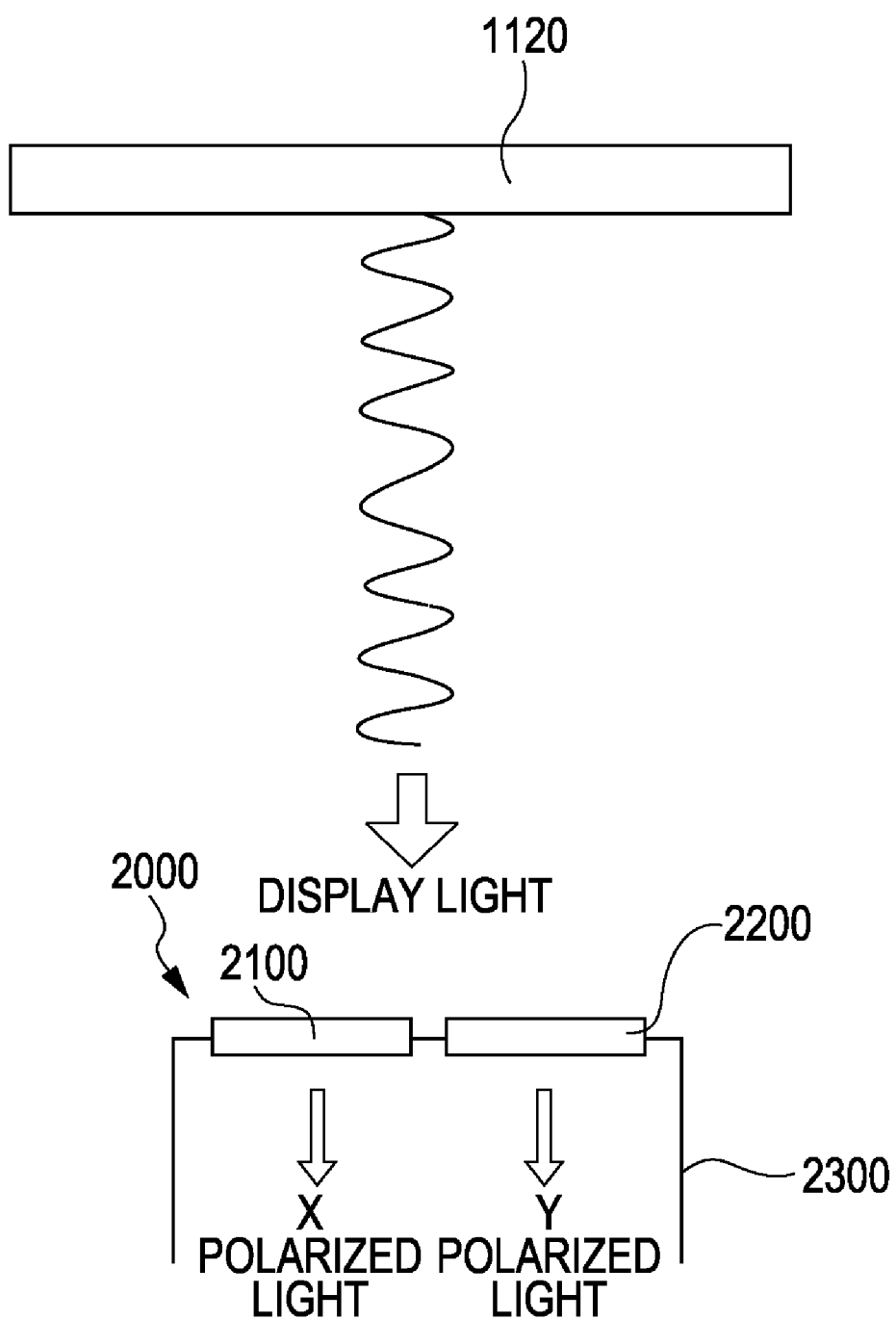
FIG. 3 is a schematic view illustrating a usage mode of polarization glasses which are used when an observer observes an image projected by the liquid crystal projector according to the embodiment.

Subsequently, the polarization glasses that an observer wears when observing an image projected by the above liquid crystal projector 1100 onto the screen 1120 are described. FIG. 3 is a schematic view illustrating a usage mode of the polarization glasses which are used when an observer observes an image projected by the liquid crystal projector 1100 according to the embodiment. The observer can recognize a projected image three-dimensionally by observing the image projected onto the screen 1120 through polarization glasses 2000.

The polarization glasses 2000 are configured by fixing a left-eye lens 2100 and a right-eye lens 2200 to a frame 2300. The left-eye lens 2100 is formed with a polarization plate having the same polarization direction (that is, X direction) as the polarization axis of a left-eye image. On the other hand, the right-eye lens 2200 is formed with a polarization plate having the same polarization direction (that is, Y direction) as the polarization axis of a right-eye image. As a result, display lights corresponding to the left-eye image can be transmitted through the left-eye lens 2100 having the same polarization direction as the polarization axis. However, the display lights corresponding to the left-eye image cannot be transmitted through the right-eye lens 2200 having the different polarization direction from the polarization axis. In contrast, display lights corresponding to the right-eye image can be transmitted through the right-eye lens 2200 having the same polarization direction as the polarization axis. However, the display lights corresponding to the right-eye image cannot be transmitted through the left-eye lens 2100 having the different polarization direction from the polarization axis.

The transmitted lights through the left-eye lens 2100 are incident onto only the left eye of the observer by being transmitted through the polarization glasses 2000. Further, the transmitted lights through the right-eye lens 2200 are incident onto only the right eye of the observer by being transmitted through the polarization glasses 2000. As a result, the observer with the polarization glasses 2000 can separately recognize the left-eye image and the right-eye image by the left eye and the right eye, respectively. Therefore, the observer with the polarization glasses 2000 can recognize the image projected onto the screen 1120 three-dimensionally.

Configuration of Liquid Crystal Panel

Figure 4:
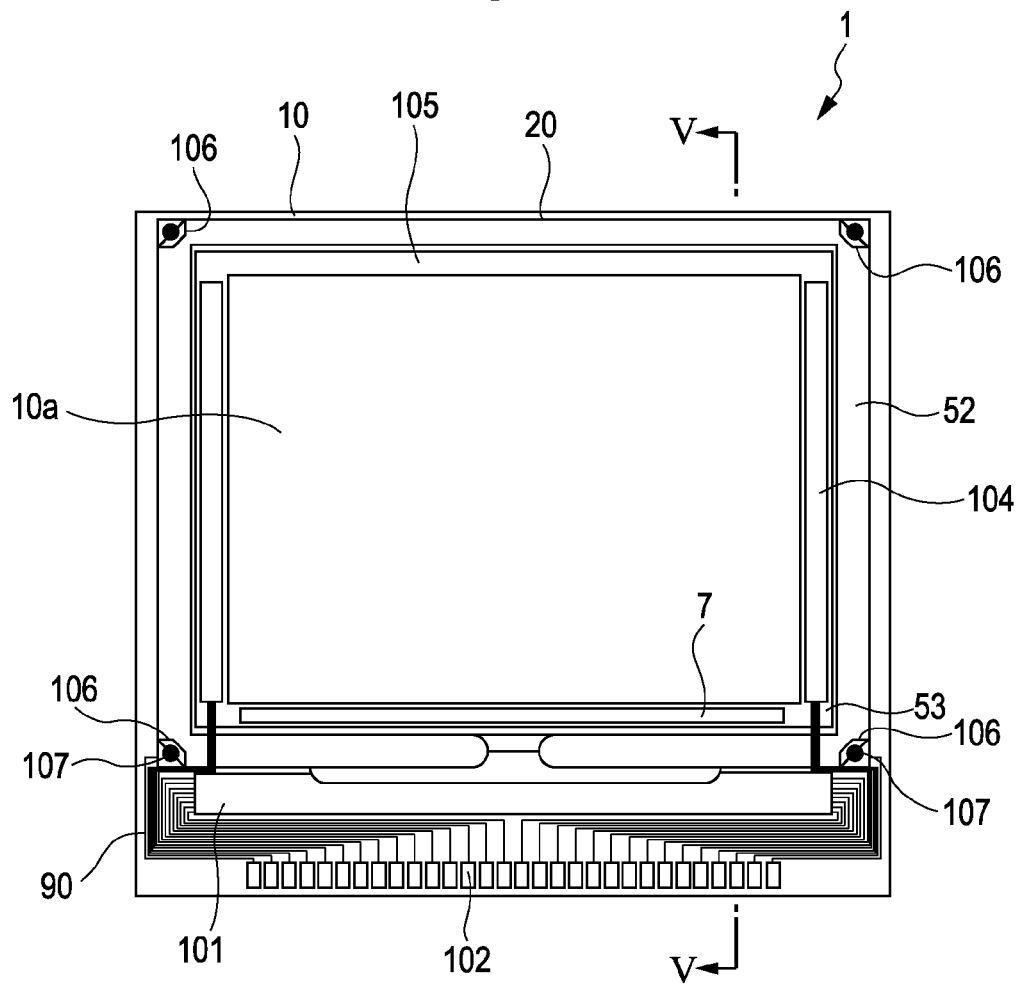
FIG. 4 is a plane view illustrating a configuration of a liquid crystal panel accommodated in a liquid crystal light bulb of the liquid crystal projector according to the embodiment.
Figure 5:
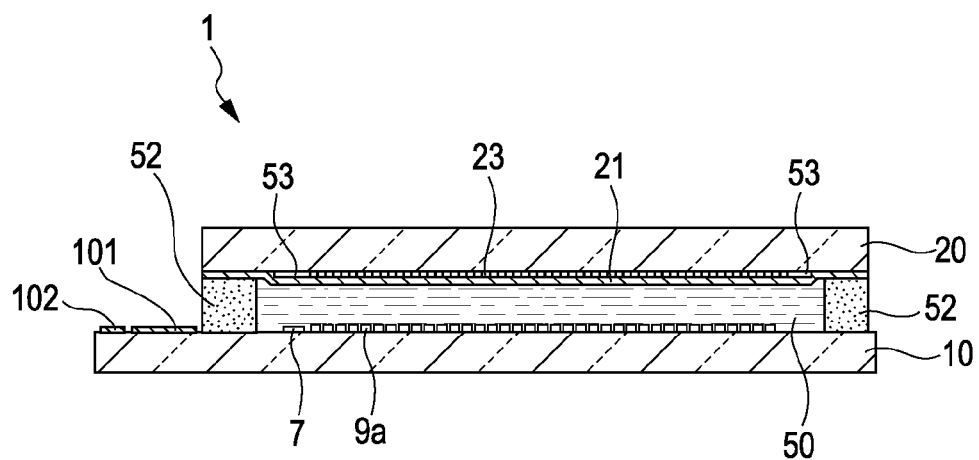
FIG. 5 is a cross-sectional view illustrating a cross section cut along a line V-V of FIG. 4.

Subsequently, a configuration of the liquid crystal panels 1 accommodated in the liquid crystal light bulbs 100R, 100G, 100B is described with reference to FIG. 4 and FIG. 5. FIG. 4 is a plane view illustrating a configuration of the liquid crystal panel 1 accommodated in the liquid crystal light bulb 100 according to the embodiment. FIG. 5 is a cross-sectional view illustrating a cross section cut along a line V-V of FIG. 4.

As shown in FIG. 4 and FIG. 5, a TFT array substrate 10 is arranged so as to be opposed to a counter substrate 20 on the liquid crystal panel 1. A liquid crystal layer 50 is sealed between the TFT array substrate 10 and the counter substrate 20. Further, the TFT array substrate 10 and the counter substrate 20 are bonded to each other with a sealing member 52 provided on the periphery of an image display region 10*a*.

In FIG. 4, a frame light shielding film 53 having a light shielding property is provided on the side of the counter substrate 20 so as to be in parallel with the inner side of the sealing member 52. A data line driving circuit 101 and external circuit connection terminals 102 are provided along one side of the TFT array substrate 10 on an outer region of the sealing member 52. A sampling circuit 7 is provided on the inner side of the sealing member 52 so as to be covered by the frame light shielding film 53. The sealing member 52 is provided along one side of the sampling circuit 7. Scanning line driving circuits 104 are provided on the inner side of the sealing member 52 along the two sides thereof so as to be covered by the frame light shielding film 53. The sealing member 52 is adjacent to one sides of the scanning line driving circuits 104. Further, a plurality of wirings 105 are provided along a remaining side of the TFT array substrate 10 so as to be covered by the frame light shielding film 53. The plurality of wirings 105 are provided in order to connect the two scanning line driving circuits 104 which are provided on both sides of the image display region 10*a*. Vertical conduction terminals 106 are arranged on the TFT array substrate 10 at positions opposing to four corner portions of the counter terminal 20. The vertical conduction terminals 106 are arranged for connecting the TFT array substrate 10 and the counter substrate 20 through vertical conduction members 107. Therefore, electrical conduction between the TFT array substrate 10 and the counter substrate 20 can be achieved with the vertical conduction terminals 106.

Routed wiring 90 is formed on the TFT array substrate 10 so as to electrically connect the external circuit connection terminals 102, the data line driving circuit 101, the scanning line driving circuits 104, the vertical conduction terminals 106 and the like.

In FIG. 5, a laminated structure is formed at the image display region 10*a* on the TFT array substrate 10. In the laminated structure, wirings such as a TFT for pixel switching, scanning lines, data lines, and the like are formed. Further, a laminated structure is formed on the periphery of the image display region 10*a*. In the laminated structure, TFTs for driving circuits constituting each of the data line driving circuit 101, the scanning line driving circuits 104 and the sampling circuit 7, the routed wiring 90, and the like are formed.

An oriented film (not shown) is formed on pixel electrodes 9*a* which are formed on the TFT array substrate 10. On the other hand, a black matrix 23 made of a light shielding material is formed on a surface of the counter substrate 20 opposing to the TFT array substrate 10. A counter electrode 21 made of a transparent material such as ITO is formed on the black matrix 23 so as to be opposed to the plurality of pixel electrodes 9*a*. An oriented film (not shown) is formed on the counter electrode 21. Further, the liquid crystal layer 50 according to the embodiment is made of a liquid crystal obtained by mixing one or several kind(s) of nematic liquid crystal(s). The liquid crystal layer 50 is in a predetermined oriented state between a pair of the oriented films.

Although not shown, a test circuit, a test pattern, and the like for testing quality, defects, or the like of the liquid crystal apparatus on the way of manufacturing or at the time of shipping, may be formed on the TFT array substrate 10 in addition to the data line driving circuit 101 and the scanning line driving circuits 104.

Figure 6:
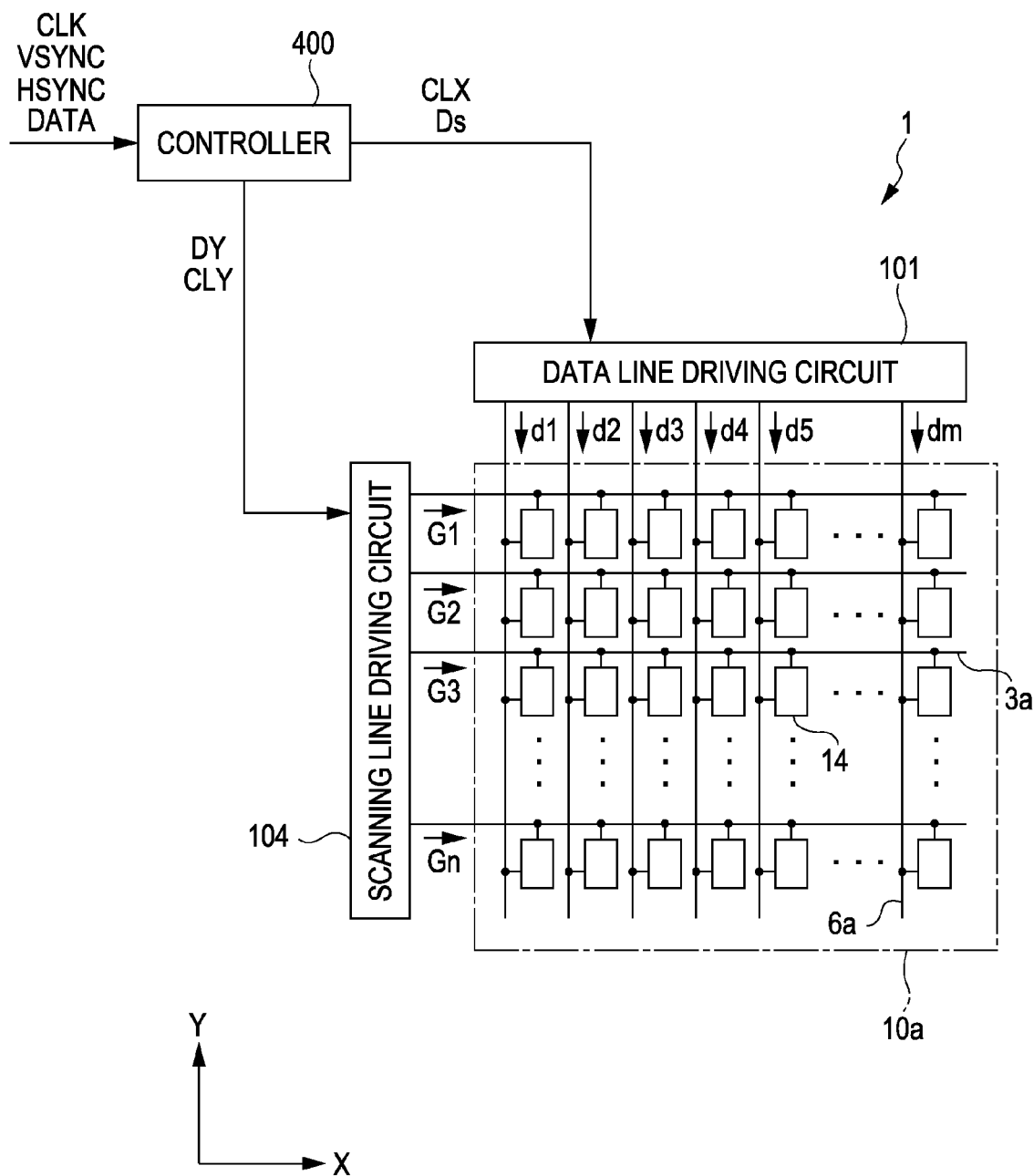
FIG. 6 is a block diagram illustrating a schematic configuration of the liquid crystal panel accommodated in the liquid crystal light bulb of the liquid crystal projector according to the embodiment.

Next, an electrical configuration of the liquid crystal panels 1 accommodated in the liquid crystal light bulbs 100R, 100G, 100B is described with reference to FIG. 6. FIG. 6 is a block diagram illustrating a schematic configuration of the liquid crystal panel 1 accommodated in each of the liquid crystal light bulbs 100R, 100G, 100B.

The liquid crystal panel 1 includes the image display region 10*a*, the data line driving circuit 101 and the scanning line driving circuits 104. An image is displayed on the image display region 10*a* onto which the display lights are incident. The image is displayed by ON/Off controlling the driving voltage applied to the liquid crystal layer 50. On the image display region 10*a*, n (n is a natural number of 2 or higher) scanning lines 3*a* are formed so as to be extended in the X (row) direction. Further, m (m is a natural number of 2 or higher) data lines 6*a* are formed on the image display region 10*a* so as to be extended in the Y (column) direction. Pixel units 14 are arranged in a matrix form so as to correspond to each intersection of the scanning lines 3*a* and the data lines 6*a*.

The controller 400 acquires a clock signal CLK, a vertical scanning signal VSYNC, a horizontal scanning signal HSYNC and an image signal DATA from the outside. Then, the controller 400 generates a scanning side start pulse DY, a scanning side transfer clock CLY, a data transfer clock CLX and an image data signal Ds based on these acquired signals. The scanning side start pulse DY is a pulse signal output at a start timing of scanning with respect to the scanning side (Y side). The scanning side transfer clock CLY is a clock signal for regulating a scan timing of the scanning side (Y side). The data transfer clock CLX is a signal for regulating a timing of transferring data to the data line driving circuit 101. The image data signal Ds is a voltage signal corresponding to the image signal DATA.

The scanning line driving circuit 104 acquires the scanning side start pulse DY and the scanning side transfer clock CLY from the controller 400 to sequentially output scanning signals G1, G2, G3, . . . , Gn to the scanning lines 3*a* on the image display region 10*a*. The scanning line driving circuit 104 is configured of a shift register, for example, and sequentially drives the scanning lines 3*a* in accordance with the scanning side start pulse DY and the scanning side transfer clock CLY supplied from the controller 400. That is, the scanning line driving circuit 104 drives the scanning lines 3*a* by a line-sequential system. Although a case where the scanning lines 3*a* are driven by the line-sequential system is described for convenience in the embodiment, the scanning lines 3*a* may be driven by another driving system.

The data line driving circuit 101 acquires the data transfer clock CLX and the image data signal Ds from the controller 400 to output data signals d1, d2, d3, . . . , dm to the data lines 6*a* on the image display region 10*a*. To be more specific, the data line driving circuit 101 sequentially latches m image data signals Ds (m corresponds to the number of the data lines 6*a*) in a certain horizontal scanning period. Then, the data line driving circuit 101 supplies the latched m image data signals Ds to the corresponding data lines 6*a*, respectively, all at once as the data signals d1, d2, d3, . . . , dm in a subsequent horizontal scanning period.

Configuration of Polarization Axis Switching Panel

Figure 7A:
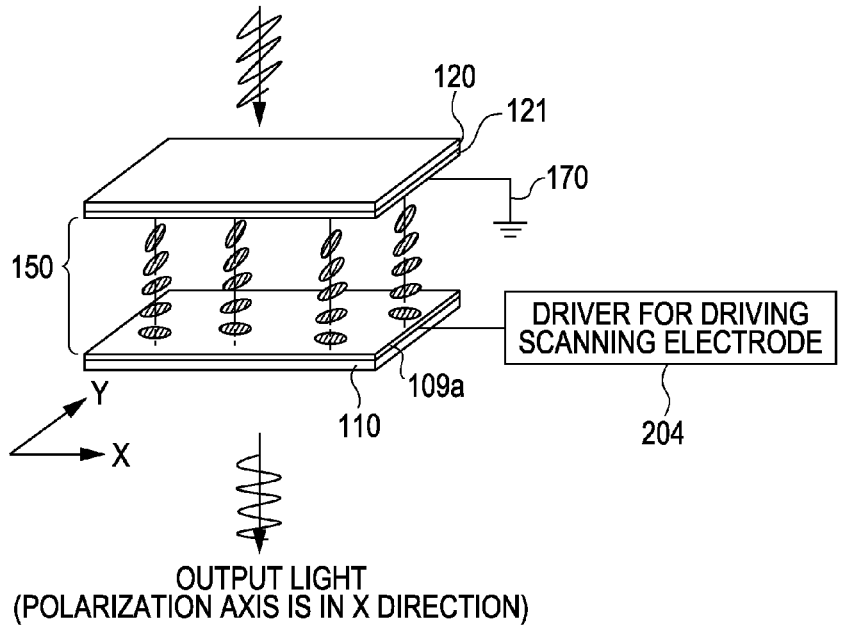
FIGS. 7A and 7B are perspective views illustrating a stereoscopic configuration in a transmission region of a polarization axis switching panel of the liquid crystal projector according to the embodiment.
Figure 7B:
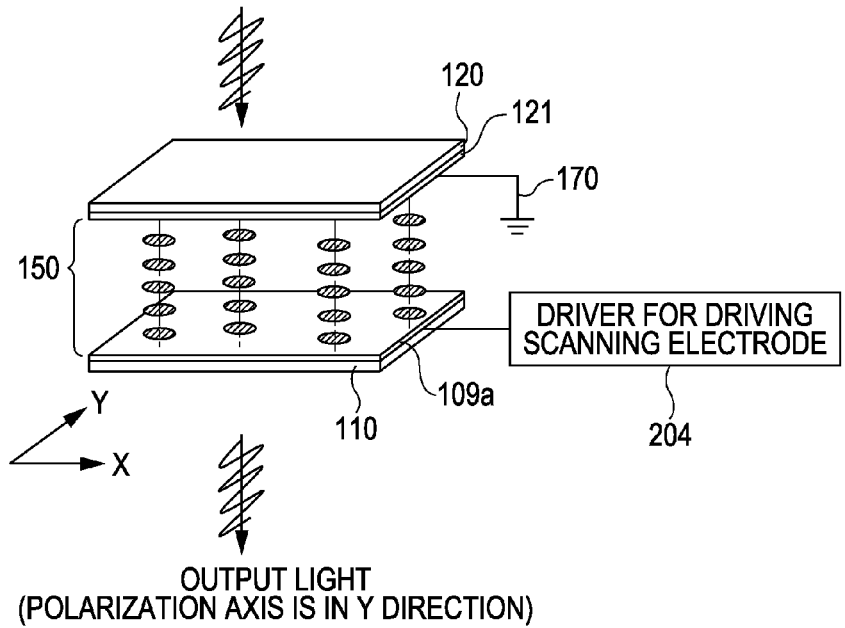

Next, a configuration of the polarization axis switching panel 1114*b* according to the embodiment is described with reference to FIGS. 7A and 7B. FIGS. 7A and 7B are perspective views illustrating a configuration of the polarization axis switching panel 1114b according to the embodiment on a transmission region 110a. The transmission region 110a is a region through which the output lights from the color select panel 1114a can be transmitted.

The polarization axis switching panel 1114b has a common configuration to the liquid crystal panel 1 in that the liquid crystal layer is sandwiched between two substrates. That is to say, the polarization axis switching panel 1114b is also one type of the liquid crystal panels. A configuration of the polarization axis switching panel 1114b is mainly described in terms of points different from those of the liquid crystal panel 1.

Figure 8:
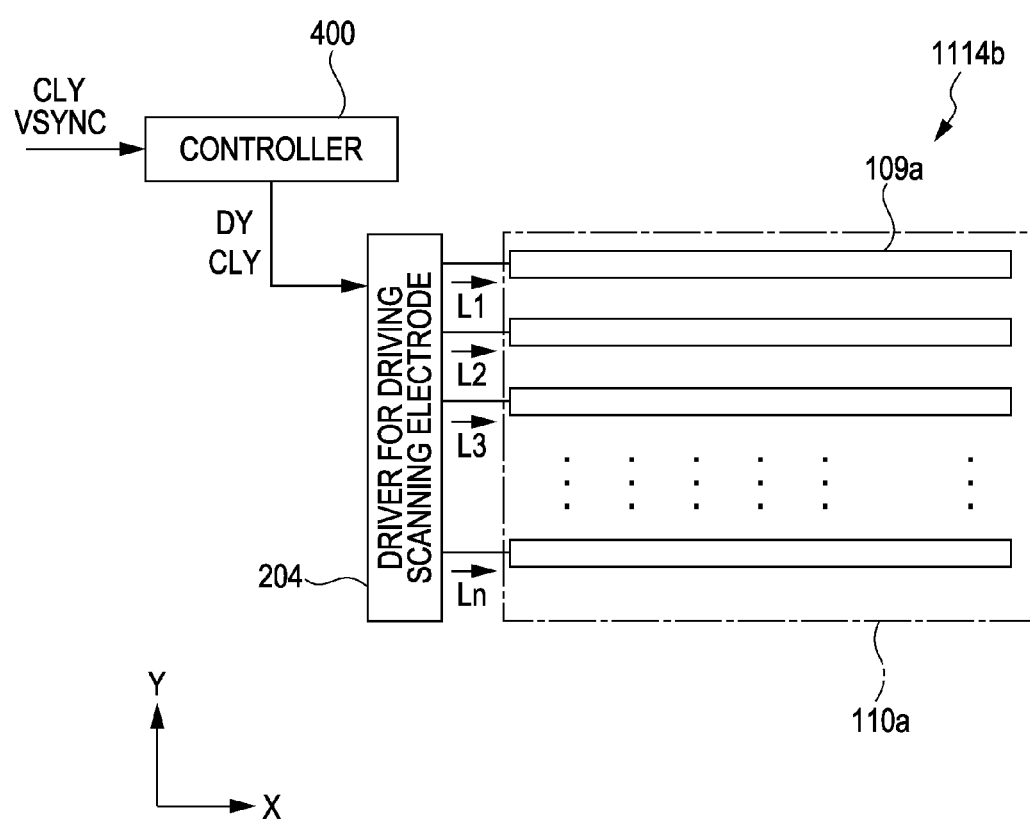
FIG. 8 is a block diagram illustrating a schematic configuration of the polarization axis switching panel of the liquid crystal projector according to the embodiment.

A scanning electrode 109a and a counter electrode 121 are formed on a device substrate 110 and a counter substrate 120, respectively, on the transmission region 110a of the polarization axis switching panel 1114b. A potential of the scanning electrode 109a is controlled by electrically connecting a driver 204 for driving the scanning electrode thereto. In FIG. 7, a detailed shape of the scanning electrode 109a is not shown for convenience of description. However, the scanning electrode 109a is divided into n electrodes having a shape extending in the X direction as shown in FIG. 8 described below. Further, the driver 204 for driving the scanning electrode can apply voltage to each of the divided scanning electrodes 109a. The counter electrode 121 is formed on the counter substrate 120 so as to be made solid. A ground line 170 is electrically connected to the counter electrode 121 so that the potential of the ground line 170 is kept at 0 V. It is to be noted that the scanning electrode 109a and the counter electrode 121 are made of a transparent material such as ITO, for example.

The polarization axis of the transmitted light through the polarization axis switching panel 1114b depends on the orientation state of the liquid crystal layer 150 which is sandwiched between the device substrate 110 and the counter substrate 120 and sealed. The orientation state of the liquid crystal layer 150 is controlled by an electric field generated by a potential difference between the scanning electrode 109a formed on the device substrate 110 and the counter electrode 121 formed on the counter substrate 120.

The liquid crystal layer 150 includes a TN liquid crystal. When the electric field between the scanning electrode 109a and the counter electrode 121 is in an OFF state, an orientation direction of TN liquid crystal molecules is twisted by 90° between the side of the device substrate 110 and the side of the counter substrate 120. Therefore, the polarization axis of the display light transmitted through the polarization axis switching panel 1114b is changed by 90° (see, FIG. 7A). On the other hand, when the electric field between the scanning electrode 109a and the counter electrode 121 is in an ON state, the orientation state of the TN liquid crystal molecules is changed by the electric field generated between the substrates. Therefore, the polarization axis of the display light transmitted through the polarization axis switching panel 1114b is not changed (see, FIG. 7B).

Note that as the TN liquid crystal molecules constituting the liquid crystal layer 150, the TN liquid crystal molecules of which responsivity to the driving voltage is fast is preferable. If the responsivity to the driving voltage is slow, it is difficult to control the switching timing of the polarization axis of the transmitted light with high precision. This causes deterioration in the precision of separating the left-eye image and the right-eye image, resulting in the deterioration of the image quality. Therefore, the TN liquid crystal molecules of which responsivity to the driving voltage is fast are preferable.

Next, an electrical configuration of the polarization axis switching panel 1114b is described with reference to FIG. 8.

FIG. 8 is a block diagram illustrating a schematic configuration of the polarization axis switching panel 1114b. The polarization axis switching panel 1114b includes the transmission region 110a and the driver 204 for driving the scanning electrode.

A switching operation of the polarization axis switching panel 1114b is controlled by the controller 400. Here, the controller 400 is common to the controller 400 in the liquid crystal panel 1 as shown in FIG. 6.

On the transmission region 110a of the polarization axis switching panel 1114b, n (n is a natural number of 2 or higher) scanning electrodes 109a are formed so as to be extended in the X (row) direction. The applied voltage value to the scanning electrodes 109a can be controlled by the driver 204 for driving the scanning electrode so as to control the potentials of the scanning electrodes 109a. The driver 204 for driving the scanning electrode is electrically connected to the scanning electrodes 109a. The specific control of the applied voltage value will be described in detail later.

The controller 400 acquires the clock signal CLK and the vertical scanning signal VSYNC so as to generate the scanning side start pulse DY and the scanning side transfer clock CLY. The driver 204 for driving the scanning electrode acquires the scanning side start pulse DY and the scanning side transfer clock CLY from the controller 400 to sequentially output driving voltages L1, L2, L3, . . . , Ln corresponding to the n scanning electrodes 109a. The driver 204 for driving the scanning electrode is configured of a shift register, for example, and sequentially outputs the driving voltage in accordance with the scanning side start pulse DY and the scanning side transfer clock CLY supplied from the controller 400. Although an example where the driving voltages Ln are output by the line-sequential system is described for convenience in the embodiment, the driving voltages Ln may be output by another driving system.

Control of Liquid Crystal Panel and Polarization Axis Switching Panel

Subsequently, an operation of the liquid crystal projector 1100 according to the embodiment is described with reference to FIG. 9 from a viewpoint of each control signal input/output to/from the liquid crystal panel 1 and the polarization axis switching panel 1114b. FIG. 9 illustrates timing charts of each control signal input/output to/from the liquid crystal panel 1 and the polarization axis switching panel 1114b when the liquid crystal projector 1100 according to the embodiment is operated.

In FIG. 9, (1) shows a timing of supplying the scanning side start pulse DY to the scanning line driving circuit 104 of the liquid crystal panel 1 and the driver 204 for driving the scanning electrode of the polarization axis switching panel 1114b. When the scanning side start pulse DY is supplied to the scanning line driving circuit 104, the scanning line driving circuit 104 starts supplying the scanning signals Gn to the n scanning lines 3a in the liquid crystal panel 1. On the other hand, when the scanning side start pulse DY is supplied to the driver 204 for driving the scanning electrode in the polarization axis switching panel 1114b, the driver 204 for driving the scanning electrode starts supplying the driving voltages Ln to the n scanning electrodes 109a.

In FIG. 9, (2) shows a timing of supplying the scanning side transfer clock CLY to the scanning line driving circuit 104 of the liquid crystal panel 1 and the driver 204 for driving the scanning electrode of the polarization axis switching panel 1114b. The scanning side transfer clock CLY in the embodiment alternately supplies binary (ON and OFF) of voltage values at a specified cycle. When the scanning side start pulse DY is supplied, the scanning line driving circuit 104 sequentially supplies the scanning signals Gn to the n scanning lines 3a in synchronization with the scanning side transfer clock CLY. At the same time, the driver 204 for driving the scanning electrode sequentially supplies the driving voltages Ln to the n scanning electrodes 109a.

In FIG. 9, (3) shows a timing of supplying the scanning signals Gn by the scanning line driving circuit 104 of the liquid crystal panel 1. After the scanning side start pulse DY is supplied from the controller 400, the scanning signals G1, G2, G3, . . . , Gn are sequentially supplied to the scanning lines 3a every half cycle of the scanning side transfer clock CLY. When the scanning signals Gn are supplied to each of the n scanning lines 3a within one field period, the scanning signals Gn are supplied to the n scanning lines 3a again at the time of subsequent supply timing of the scanning side start pulse DY.

In FIG. 9, (4) shows a timing of supplying the driving voltages Ln by the driver 204 for driving the scanning electrode in the polarization axis switching panel 1114b. After the scanning side start pulse DY is supplied from the controller 400, the driving voltages L1, L2, L3, . . . , Ln each having a +V value are sequentially supplied to the scanning electrodes 109a every half cycle of the scanning side transfer clock CLY in the first field period. When the driving voltages Ln (+V) are supplied to each of the n scanning electrodes 109a in one field period, the first field period is terminated at the time of a subsequent supply timing of the scanning side start pulse DY. In the second field period, the driving voltages Ln of zero are supplied again to the n scanning electrodes 109a. When the driving voltages Ln of zero are supplied to each of the n scanning electrodes 109a in one field period, the second field period is terminated at the time of a subsequent supply timing of the scanning side start pulse DY. In such a manner, the orientation state of the liquid crystal layer 150 can be changed by ON/OFF controlling the driving voltages Ln supplied to the n scanning electrodes 109a every field period.

Although the driving voltages Ln are made to be ON state again in the third field period, the driving voltages Ln are applied in a polarity opposite to that in the first field period. If the driving voltages Ln having only one polarity are continued to be supplied, persistence is caused on the liquid crystal layer 150, resulting in reduction in the life-time of the polarization axis switching panel 1114b. Therefore, the driving voltages Ln are applied in an opposite polarity in order to prevent such a problem from occurring. Note that the driving voltages Ln of zero are sequentially supplied in the fourth field period as in the second field period.

The supply timings of the driving voltages L1, L2, L3, . . . , Ln are delayed in comparison with those of the scanning signals G1, G2, G3, . . . , Gn on the liquid crystal panel 1 by half cycle of the scanning side transfer clock CLY. The delay is set in order to prevent the left-eye image and the right-eye image from being mixed. The mixture of the left-eye image and the right-eye image is caused by a factor that response speeds of the liquid crystal sealed in the liquid crystal panel 1 and the polarization axis switching panel 1114b are different. The length of the delay period is preferably determined as follows in consideration of the characteristics of the liquid crystal panel 1 and the polarization axis switching panel 1114b. That is, the length of the delay period is obtained experimentally or theoretically or calculated by a simulation such that the display lights having polarization axes which are deviated from each other by 90° are formed to project the left-eye image and the right-eye image.

The liquid crystal panel 1 and the polarization axis switching panel 1114b are driven by repeating the above described control. This makes it possible to suitably process the left-eye image and the right-eye image having the polarization axes which are different from each other by 90°.

In the present application, the number of the scanning lines 3a on the liquid crystal panel 1 is the same as that of the scanning electrodes 109a on the polarization axis switching panel 1114b. However, the number of the scanning lines 3a on the liquid crystal panel 1 may be different from that of the scanning electrodes 109a on the polarization axis switching panel 1114b. In this case, however, the scanning line driving circuit 104 and the driver 204 for driving the scanning electrode are preferably controlled such that the field frequency of the liquid crystal panel 1 and that of the polarization axis switching panel 1114b are synchronized with each other. For example, the scanning line driving circuit 104 and the driver 204 for driving the scanning electrode are preferably controlled such that a frame cycle of the liquid crystal panel 1 is the same as that of the polarization axis switching panel 1114b.

Modification

Subsequently, a modification of the above embodiment is described with reference to FIG. 10. FIG. 10 illustrates timing charts of each control signal input/output to/from the liquid crystal panel 1 and the polarization axis switching panel 1114b when the liquid crystal projector 1100 according to the modification is operated. The liquid crystal projector 1100 according to the modification is different from that according to the embodiment in that black display is performed on the image display region 10a of the liquid crystal panel 1 in field periods where the switching operation by the polarization axis switching panel 1114b is performed in the modification.

As shown in FIG. 10, black display is performed on the image display region 10a of the liquid crystal panel 1 in the first and third field periods where the switching operation of the polarization axes of the display lights is performed. At this time, the switching operation is performed when the polarization axis switching panel 1114b changes the driving voltages Ln. The black display is performed by setting an image data voltage Ds supplied from the data line driving circuit 101 on the liquid crystal panel 1 to each of the data lines 6a to a high level. On the other hand, the image data voltage Ds corresponding to the projected image is supplied to the data line driving circuit 101 on the liquid crystal panel 1 in the second and fourth field periods where the switching operation of the polarization axes of the display lights is not performed.

As described above, the left-eye image and the right-eye image can be effectively prevented from being mixed by performing black display on the image display region 10a of the liquid crystal panel 1 in field periods where the polarization axes of the display lights are switched by the polarization axis switching panel 1114b. In other words, at the time of switching of the polarization axes of the display lights, the transmission region 110a of the polarization axis switching panel 1114b has a region where the driving voltages Ln have been already supplied and a region where the driving voltages Ln have not been supplied yet in a mixed form. Since the orientation states of the liquid crystal layer 150 are different between these regions, orientation axes of the display lights cannot be defined to one. Then, in the modification, the left-eye image and the right-eye image can be effectively prevented from being mixed by projecting a display image after the switching operation of the polarization axes of the display lights by the polarization axis switching panel 1114b is surely completed.

The invention is not limited to the above embodiment and can be appropriately modified in a range without departing from a scope or a spirit of the invention read by scope of claims and the entire specification. An electrooptical apparatus and an electronic device including such modification are also included in a technical range of the invention.

The entire disclosure of Japanese Patent Application No. 2009-154809, filed Jun. 30, 2009 is expressly incorporated by reference herein.

What is claimed is:

1. An electrooptical apparatus comprising:
   a plurality of first electrooptical panels which enable a color image to be displayed by combining output lights from the plurality of first electrooptical panels;
   a polarization axis correction unit through which the output lights from each of the plurality of first electrooptical panels are transmitted and which makes polarization axes of the transmitted output lights aligned; and
   a polarization axis switching section which switches a polarization axis of the output light from the polarization axis correction unit to a direction intersecting with the direction of the polarization axis at a predetermined timing.

2. The electrooptical apparatus according to claim 1, wherein:
   each of the plurality of first electrooptical panels includes an image signal supply unit that supplies image signals corresponding to display images, and
   the image signal supply unit supplies an image signal corresponding to black display for a predetermined period immediately after the predetermined timing.

3. The electrooptical apparatus according to claim 1, further comprising a prism that refracts each of the output lights from the plurality of first electrooptical panels such that incident lights onto the polarization axis correction unit become a single beam.

4. The electrooptical apparatus according to claim 1,
   wherein the polarization axis switching section is a second electrooptical panel that includes TN liquid crystal molecules.

5. The electrooptical apparatus according to claim 4,
   wherein a timing of updating display images on the plurality of first electrooptical panels is synchronized with the predetermined timing.

6. The electrooptical apparatus according to claim 1, further comprising a projection lens that projects the color image in an enlargement or reduction manner.

7. The electrooptical apparatus according to claim 6,
   wherein the output light from the projection lens is transmitted through the polarization axis correction unit and the polarization axis switching section.

8. The electrooptical apparatus according to claim 6,
   wherein the output light from the polarization axis switching section is transmitted through the projection lens.

9. An electronic device comprising:
   an electrooptical apparatus that includes:
      a plurality of first electrooptical panels which enable a color image to be displayed by combining output lights from the plurality of first electrooptical panels;
      a polarization axis correction unit through which the output lights from each of the plurality of first electrooptical panels are transmitted and which makes polarization axes of the transmitted output lights aligned; and
      a polarization axis switching section which switches a polarization axis of the output light from the polarization axis correction unit to a direction intersecting with the direction of the polarization axis at a predetermined timing.

10. The electronic device according to claim 9, wherein:
    each of the plurality of first electrooptical panels includes an image signal supply unit that supplies image signals corresponding to display images, and
    the image signal supply unit supplies an image signal corresponding to black display for a predetermined period immediately after the predetermined timing.

11. The electronic device according to claim 9, wherein the electrooptical device further comprises a prism that refracts each of the output lights from the plurality of first electrooptical panels such that incident lights onto the polarization axis correction unit become a single beam.

12. The electronic device according to claim 9,
    wherein the polarization axis switching section is a second electrooptical panel that includes TN liquid crystal molecules.

13. The electronic device according to claim 12,
    wherein a timing of updating display images on the plurality of first electrooptical panels is synchronized with the predetermined timing.

14. The electronic device according to claim 9, wherein he electrooptical device further comprises a projection lens that projects the color image in an enlargement or reduction manner.

15. The electronic device according to claim 14,
    wherein the output light from the projection lens is transmitted through the polarization axis correction unit and the polarization axis switching section.

16. The electronic device according to claim 14,
    wherein the output light from the polarization axis switching section is transmitted through the projection lens.

* * * * *